V. C. HAMISTER.
CABLE CONNECTION FOR BRUSHES.
APPLICATION FILED JUNE 2, 1919.

1,412,079.

Patented Apr. 11, 1922.

INVENTOR
V. C. HAMISTER
BY Ira J. Adams.
ATTORNEY

# UNITED STATES PATENT OFFICE.

VICTOR CARL HAMISTER, OF CLEVELAND, OHIO, ASSIGNOR TO NATIONAL CARBON COMPANY, INC., A CORPORATION OF NEW YORK.

CABLE CONNECTION FOR BRUSHES.

1,412,079.

Specification of Letters Patent. Patented Apr. 11, 1922.

Application filed June 2, 1919. Serial No. 301,195.

*To all whom it may concern:*

Be it known that I, VICTOR C. HAMISTER, a citizen of the United States, residing at Cleveland, in the county of Cuyahoga and State of Ohio, have invented a certain new and useful Improvement in Cable Connections for Brushes, of which the following is a full, clear, and exact description.

This invention relates to brushes for dynamo electric machines, and more particularly to cable connections for the same.

There are various forms of cable connections for brushes, a common one involving the use of solder as a retaining medium. In this type of connection it is the usual practice to drill a small hole a little larger than the cable or "pigtail" down from the top of the brush, and to drill a considerably larger hole from one side of the brush, until the two holes join. The cable is then passed through the small hole and one end pressed somewhat loosely into the large cavity. Solder is next added on top of the cable in the cavity until the remainder of the cavity is substantially filled flush with the sides of the brush. With this arrangement the solder runs out whenever the brushes become overheated in use, as is quite frequently the case. There being nothing to cause the cable to adhere to the brush, it soon comes out of the cavity and the connection is therefore ruined. In my improvement the solder is applied in such a way that the brush can be repeatedly overheated without the solder running out, and therefore the brush will stand great overloads without in any way impairing the good connection between the brush and cable. The manner in which my improvement is brought about will now be described, reference being had to the drawings in which:

Figure 1:
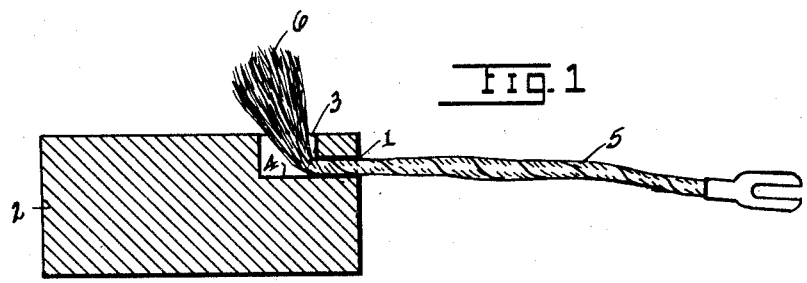
Fig. 1 is a section of a brush having a cable connection ready for being compacted into the cavity.

My improvement could be used in various ways, but I have by way of example shown it in connection with the usual type of brush previously referred to.

A small hole 1 is drilled in the brush 2 and then a larger hole 3 is drilled down until it intersects the hole 1. The bottom of the cavity is then copper plated as indicated at 4 and a cable 5 is passed through the hole 1 and out through the cavity 3. The end of the cable is frayed out by untwisting the strands 6 as shown, and these are then tamped or otherwise compacted down into the cavity against the copper coating, as shown at 7 in Fig. 2. A suitable size chunk of solder 8 is then placed on top of the compacted portion 7 of the cable after adding a suitable flux for copper, and a source of heat, such as an oxy-hydrogen flame 9, is caused to melt the solder 7 and the flame is played on the solder until it flows into and through the compacted portion of the cable strands. The flame is then removed and the solder permitted to cool.

To further increase the solidity and conductivity of the connection, I sometimes drill a small hole through the compacted copper wires and a portion of the brush, into which I drive an escutcheon pin 3′ of brass or other metal. This pin, however, may be omitted when desired.

By causing the solder to run down in between the strands and against the copper coating 4, all of the small cavities are filled up and the plating is firmly soldered to the adjacent strands. There is, however, no excess of solder utilized to hold the cable in position, and all of it is firmly held in place by capillary action. Therefore, after the solder is once in position the brush could be inverted and the molten solder would not run out.

Figure 3:
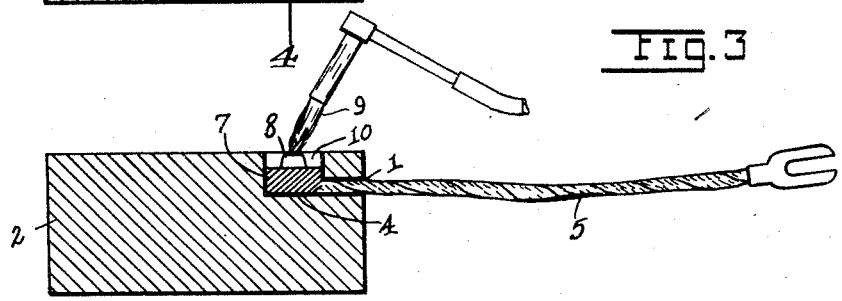
Fig. 3 is a section of a brush showing the method of soaking the solder into the cable to join it to the brush.
Figure 4:
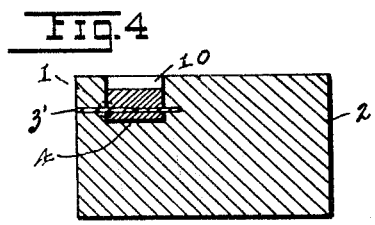
Fig. 4 is a cross section on line 4—4 of Fig. 2 after the pin has been inserted.

I have found that a brush connection of this type is far superior to the ordinary solder connection where the solder is placed on top of the end of the cable 7 to substantially fill the space indicated at 10 in Fig. 3. The resistance is exceedingly low in this type of connection, and a brush can be repeatedly overloaded to the point where the solder melts from the excessive heat generated, and the solder will still remain in place even though there is continual chattering of the brush from rough commutators and high mica. In fact, the solder will stay in place even though an attempt is made to displace it by inverting the brush and jarring it with blows from a hammer. In view of this, the brush will be found to give excellent service on all electric motors, even those repeatedly subject to overload, in which connection it has heretofore been considered impracticable to use soldered cables on brushes.

Figure 2:
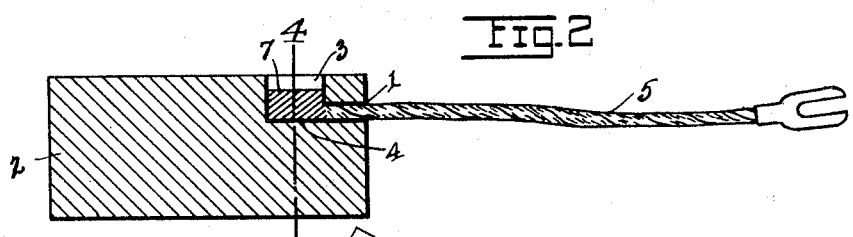
Fig. 2 is a section of the brush showing the cable compacted into position.

While my invention involves the "soaking" of the solder down in between the dense mass of strands and onto the copper plating beneath, it of course would be permissible to fill the remainder of the cavity 3 in Fig. 2 with solder or cement after the interstices between the strands have been filled. This would add nothing to the properties of the connection however, and if additional solder were used in this way, the surplus would be shaken out when melted from overload, just as in the prior types of connections. However, the solder permeating the stranded mass 7 will stay in position and resolder the connection as soon as it cools down.

While I have shown a preferred form of heating the solder by a flame 9, it of course is possible to heat the solder in other ways, to cause it to permeate the stranded mass, and my invention is not to be limited to any particular mode of heating.

Having described my invention, what I claim is:

1. The method of attaching a stranded flexible conductor to a carbon brush that comprises forming in said brush intersecting holes of different transverse sections, plating at least the bottom of the hole having the larger section, inserting the end of said conductor through the smaller of said holes into the larger, untwisting the stranded end of said conductor that projects into such larger hole, compacting said untwisted end in the larger hole and introducing molten solder into the compacted mass of untwisted strands to fill the spaces between such strands and to join such compacted mass to said plating.

2. A brush for dynamo electric machines, such brush having intersecting holes of different cross-sectional areas, a copper coating at the bottom of the larger hole, a stranded flexible conductor extending through the smaller hole and having its end disposed in the other hole, the strands of such end being untwisted and compacted against said copper coating, solder in the spaces between such compacted strands and between such strands and said coating, and a securing pin passing through a portion of said brush and said compacted strands.

3. A brush for dynamo electric machines, such brush having intersecting holes, a metal coating in one of said holes, a stranded cable extending through one of said holes and having its end disposed in the other hole adjacent said coating, the strands of said ends being untwisted and compacted against said coating, and solder in the spaces between such compacted strands and between said strands and said coating.

In testimony whereof, I hereunto affix my signature.

VICTOR CARL HAMISTER.